(12) United States Patent
Hong et al.

(10) Patent No.: US 6,928,382 B2
(45) Date of Patent: Aug. 9, 2005

(54) METHOD AND APPARATUS FOR MEASURING SPEED OF MOVING BODY USING ACCELEROMETER

(75) Inventors: Hyun-Su Hong, Seongnam-si (KR); Kook-Yeon Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/808,756

(22) Filed: Mar. 25, 2004

(65) Prior Publication Data

US 2005/0021270 A1 Jan. 27, 2005

(30) Foreign Application Priority Data

Jul. 22, 2003 (KR) ................................ 10-2003-0050221

(51) Int. Cl.$^7$ ............................................. G01P 15/00
(52) U.S. Cl. ................................... 702/141; 73/514.02
(58) Field of Search ........................ 702/141; 73/514.02

(56) References Cited

U.S. PATENT DOCUMENTS

| | | | | |
|---|---|---|---|---|
| 4,531,300 A | * | 7/1985 | Heidel et al. ............. | 33/366.13 |
| 5,265,472 A | * | 11/1993 | Pfeifle et al. ............ | 73/514.02 |
| 5,774,832 A | * | 6/1998 | Vanderwerf ................ | 701/220 |
| 5,828,987 A | * | 10/1998 | Tano et al. ................ | 702/150 |
| 5,925,087 A | * | 7/1999 | Ohnishi et al. ............ | 701/70 |
| 5,986,583 A | * | 11/1999 | Nakano et al. ............. | 340/988 |

* cited by examiner

Primary Examiner—John Barlow
Assistant Examiner—Anthony T. Dougherty
(74) Attorney, Agent, or Firm—Dilworth & Barrese LLP

(57) ABSTRACT

Disclosed are an apparatus and a method for measuring the speed of a moving body using an accelerometer. A value of earth's gravitational acceleration component is detected from the measurements from the accelerometer and is removed from the acceleration value. Then, the acceleration value, after removal of the earth's gravitational acceleration component, is used to obtain the speed of the moving body. The earth's gravitational acceleration component is detected using a movement average at a point of time when the speed of the moving body is to be measured. By using the magnitude of a difference between a value obtained by removing an x-axis movement average from an x-axis measurement from the two-axis accelerometer and another value obtained by removing a y-axis movement average from a y-axis measurement from the two-axis accelerometer, it is possible to regulate a window for calculating the movement average and a weight value to each of the measurements included in the window. The present invention saves cost by reducing the number of expensive gyroscopes in implementing a speed measuring apparatus for vehicles. In addition, the speed measuring apparatus designed according to the present invention is superior to that designed according to the prior art in performance and improves the accuracy of position estimation in position estimation apparatuses for vehicles.

14 Claims, 5 Drawing Sheets

PROCEDURE FOR DETECTING GRAVITY COMPONENT

| TIME | MEASUREMENT VALUE |
| --- | --- |
| ⋮ | ⋮ |
| $t_{k-2}$ | $f_{x(k-2)}, f_{y(k-2)}$ |
| $t_{k-1}$ | $f_{x(k-1)}, f_{y(k-1)}$ |
| $t_k$ | $f_{x(k)}, f_{y(k)}$ |
| $t_{k+1}$ | $f_{x(k+1)}, f_{y(k+1)}$ |
| $t_{k+2}$ | $f_{x(k+2)}, f_{y(k+2)}$ |
| ⋮ | ⋮ |

FIG.5

METHOD AND APPARATUS FOR MEASURING SPEED OF MOVING BODY USING ACCELEROMETER

PRIORITY

This application claims priority to an application entitled "METHOD AND APPARATUS FOR MEASURING SPEED OF MOVING BODY USING ACCELEROMETER" filed with the Korean Intellectual Property Office on Jul. 22, 2003 and assigned Ser. No. 2003-50221, the contents of which are hereby incorporated by reference.

BACKGROUND OF THE INVENTION

1. Field of the Invention

The present invention relates to a method and an apparatus for measuring the speed of a moving body, and more particularly to a method and an apparatus for measuring the speed of a moving body using an accelerometer.

2. Description of the Related Art

As generally known in the art, a navigation system is mounted on a moving body (e.g., a ship, an airplane, an automobile) and used for showing the position of the moving body and providing a route to a destination. The navigation system must be aware of the exact position of the moving body in order to find its position and provide the route to a destination.

Accordingly, the navigation system is usually provided with a positioning device to determine its own position. The positioning devices are classified into two types: a type of devices that determine positioning with aid from outside and another type of devices that determine positioning with an internal sensor. A typical example of the former is a Global Positioning System (GPS) and that of the latter is a Dead Reckoning (DR) system using an inertial sensor.

The DR system, comprising an inertial sensor, uses a gyroscope for sensing the rotational movement of a moving body and an accelerometer for sensing the, linear movement of the moving body to calculate the velocity and position of the moving body. In particular, the velocity of the moving body can be obtained by combining the information on speed from the accelerometer and the information on the direction of movement from the gyroscope.

Conventionally, for an accurate calculation of the velocity of a moving body in a three-dimensional space, three one-axis gyroscopes, as well as three one-axis accelerometers are necessary, installed in orthogonal directions independent from one another. However, the number of sensors may be reduced according to the type of the moving body. For example, in the case of a vehicle, the roll motion, i.e., the rotational movement of the axle (the axle extending between the front and read ends of the vehicle) and the linear movement perpendicular to the ground can be ignored and the number of sensors can be reduced accordingly.

Generally, in order to obtain the travel velocity vector of a vehicle on a road using a DR system with an inertial sensor, the angle of travel direction and the speed in the travel direction must be measured. To measure the angle of travel direction, the DR system requires a gyroscope installed on an axis perpendicular to the plane in which the axle of the vehicle is placed. To measure the speed in the travel direction, the DR system requires not only an accelerometer, installed in the direction of the axle, but also a measured value of the inclination angle of the road.

The reason the DR system has to measure the inclination angle of the road for determining the travel velocity vector of a vehicle is that a gravitational acceleration is included in the measurement from the accelerometer and such a gravitational acceleration can be computed from the inclination angle of the road. The gravitational acceleration is always directed perpendicular to the surface of the earth's ellipsoid (the spherical'surface formed in a direction perpendicular to the gravitational acceleration). As the inclination angle of the road changes, the direction of the axis of the accelerometer (fixed to the vehicle in a direction) mounted on the vehicle also changes. Then, the gravitational acceleration component included in the output from the accelerometer is varied accordingly. As a result, the gravitational acceleration component, which is variable according to the inclination angle of the road, must be removed from the output of the accelerometer, to obtain the pure movement acceleration of the moving body. However, without the information on the inclination angle of the road there can be no distinction between the horizontal movement acceleration component and the vertical gravitational acceleration component in the travel direction and, consequently, the actual speed of the moving body cannot be obtained.

FIG. 1 is a drawing illustrating the concept of gravity compensation for the output from the accelerometer. Referring to the drawing, the inclination angle of the road is defined as the inclination angle relative to the plane perpendicular to the direction ±g of the earth's gravitational acceleration. The angle between the plane 10 perpendicular to the direction ±g of the earth's gravitational acceleration and the plane 20 extending in the travel direction of the vehicle is defined as the inclination angle θ of the road.

As in the case shown in FIG. 1, when a vehicle 30 travels on a plane 20 inclined at an angle θ relative to a plane 10 perpendicular to the direction ±g of the earth's gravitational acceleration, the measurement $\vec{a}$ from an accelerometer mounted on the vehicle 30 is defined in Equation 1 as follows:

$$\vec{a} = \vec{r_a} + \vec{g} \qquad (1)$$

That is to say, the measurement $\vec{a}$ from the accelerometer mounted on the vehicle 30 includes an actual acceleration $\vec{r_a}$ and the earth's gravitational acceleration component $\vec{g}$. The earth's gravitational acceleration component $\vec{g}$ is measured together with the actual rate of change of the movement speed and, therefore, constitutes a considerable cause of error in measuring the speed.

As a result, the gravitational acceleration $\vec{g}$ must be subtracted from the measurement $\vec{a}$ from the accelerometer for an accurate measurement of velocity and the inclination angle of the road must be measured for the gravitational acceleration $\vec{g}$. This usually requires the installation of an additional gyroscope or an inclinometer in the DR system.

In the case of a DR system for vehicles, gyroscopes have been used conventionally to measure the inclination angle of the road and, therefore, two or more gyroscopes have been commonly used. In particular, the DR system for vehicles according to the prior art had to comprise a gyroscope for determining the travel direction and another gyroscope for measuring the inclination angle of the road. Basically, the gyroscope is a sensor measuring the rate of change of an angle. Accordingly, if a gyroscope is to be used for measuring the inclination angle of the road in a DR system for vehicles, the output from the gyroscope should be integrated to obtain the inclination angle of the road. As a result, when a gyroscope is used to measure the inclination angle of the road, the error component from the gyroscope tends to be integrated during the integral process. This results in a drawback of an accumulation of errors in estimating the inclination angle of the road over time.

Due to such a drawback, the inclination angle of the road is mainly obtained with the aid of auxiliary sensors, which are free of error-accumulation properties, instead of using gyroscopes only. Additional sensors, such as inclinometers, may be installed to measure the inclination angle of the road accurately. However, in order to minimize the number of sensors, an approach of using an already-equipped accelerometer as the auxiliary sensor is utilized frequently.

FIG. 2 illustrates the procedure for measuring a gravitational component from the output from an accelerometer according to an embodiment of the prior art. In conventional systems, as shown, the output from the accelerometer, comprising both a gravitational acceleration component a and an actual acceleration component b, is made to pass through a Low-Pass Filter (LPF) 40 to measure the gravitational acceleration component having a relatively low frequency, and calculate the inclination angle of the road.

However, although the information on the inclination angle of the road obtained by the above-mentioned method according to the prior art does not suffer from the error-accumulation property, thus obtained information is sensitive to the performance of the accelerometer, while it is insensitive to the change of the inclination angle.

Accordingly, it has been proposed to combine an estimation value from a gyroscope, which is sensitive to an instant change, with that from an accelerometer, which is free of the error-accumulation property, to obtain an estimation value of the inclination angle of the road, which has less error-accumulation and is not insensitive to a change.

In summary, the prior art added gyroscopes to the DR system for vehicles to estimate the inclination angle of the road, because an accurate measurement of the earth's gravitational acceleration, which is needed to compute an accurate inclination angle of the road, is impossible if only accelerometers are used. However, such addition of expensive gyroscopes makes it impossible to realize an inexpensive DR speed measuring device.

SUMMARY OF THE INVENTION

Accordingly, the present invention has been made to solve the above-mentioned problems occurring in the prior art. The first object of the present invention is to provide an apparatus and a method for realizing an inexpensive Dead Reckoning (DR) speed measuring device using accelerometers.

The second object of the present invention is to provide an apparatus and a method for measuring the earth's gravitational acceleration component included in the acceleration component of a moving body using accelerometers.

The third object of the present invention is to provide an apparatus and a method for measuring the speed of a moving body by measuring the earth's gravitational acceleration component using accelerometers.

Fourth object of the present invention is to provide an apparatus and a method capable of measuring the actual acceleration value of a moving body more accurately by using measurement values from a two-axis accelerometer.

In order to accomplish these objects, there is provided a method for measuring the speed of a moving body using an accelerometer, comprising the steps of: setting a standard for regulating at least two windows, each of which is has a range of time for obtaining a movement average for a measurement value at a point of time from a number of measurement values measured by the accelerometer, and weight values for each of the measurement values included in the windows; storing the measurements from the accelerometer; determining whether the moving body has stopped at a point of time when the speed of the moving body is to be measured; detecting an irregular constant of the accelerometer and a gravitational acceleration component in a stopped condition if the moving body has been determined to be in a stopped condition; regulating the windows and the weight values based on a predetermined standard for regulating the windows and the weight values if the moving body has been determined to be in a stopped; detecting the irregular constant of the accelerometer for measuring the gravitational acceleration component, as well as the gravitational acceleration component at the point of time, based on the information on the regulated windows and the weight values and calculating an actual acceleration value at the pertinent point of time by subtracting the irregular constant and the gravitational acceleration component, which have been detected during either of the preceding steps, from the measurement measured by the acceleration at the point of time and calculating the speed of the moving body based on the actual acceleration value.

In accordance with another aspect of the present invention, there is provided a apparatus for measuring the speed of a moving body using an accelerometer, comprising: an acceleration-measuring unit for measuring the current acceleration of a moving body using an accelerometer mounted on the moving body; an acceleration-storing unit for storing the information on the acceleration measured by the acceleration-measuring unit according to the measurement time; a gravitational acceleration-compensating unit for calculating a movement average of an acceleration at a point of time when an actual acceleration is to be obtained using the acceleration measurements stored in the acceleration-storing unit, wherein a weight value is assigned to each of the measurements from the accelerometer included in a window, which is a range of time from the point of time when the actual acceleration is to be obtained; the weight value is used to calculate the movement average; and the earth's gravitational acceleration component is compensated for the acceleration measurement at the pertinent point of time based on the movement average; and a speed-calculating unit for calculating the speed of the moving body using the information on the actual acceleration after compensation of the earth's gravitational acceleration by the gravitational acceleration-compensating unit.

BRIEF DESCRIPTION OF THE DRAWINGS

The above and other objects, features and advantages of the present invention will be more apparent from the following detailed description taken in conjunction with the accompanying drawings, in which:

FIG. 5 is a table illustrating a movement window according to an embodiment of the present invention;

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

First, the outline of the present invention will now be explained.

According to the present invention, the earth's gravitational acceleration component is measured using an accelerometer and its value is subtracted from an acceleration value to determine the speed of a moving body. Particularly, the earth's gravitational acceleration component is determined by an average value obtained from a set comprising a currently-measured value and a number of previously-measured values, these values being obtained by the accelerometer at a predetermined time-interval. The range of time from the present to the time of measurement of the number of measurement values is called a "window" and the average value obtained from the measurement values included in the window is called a "movement average". That is to say, that in order to obtain the actual acceleration value at a given point of time, the movement average at that point of time is calculated and is subtracted from the measurement obtained from the accelerometer at the same point of time.

When the actual acceleration is to be estimated, according to the present invention, it is determined whether the window or the weight value is set properly to measure the earth's gravitational acceleration component at the present point of time. Then, if necessary, a calibration modification is made accordingly to the window and then to the weight value related to each of the measurements included in the window for the calculation of the movement average.

In the present invention, a reference parameter is set for modification of the window and the weight value and they are modified according to the value of the reference parameter. When the window is modified according to the reference parameter, the size of the reference parameter and that of the window are set in an inversely proportional relationship. For example, if the reference parameter exceeds a determined reference value, the earth's gravitational acceleration is considered to have been changed and the size of the window is reduced accordingly. It is also possible to make the windows uniform and assign different weight values to each of the measurements included in the window. For example, if the reference parameter exceeds a determined reference value, the more recent measurement included in the window is given the larger weigh value. This reduces the size of the window. Of course, the regulation of the window and the modification of the weight value may be used together. The method for obtaining the reference parameter will be described later with regard to "accxy(k)".

Figure 1:
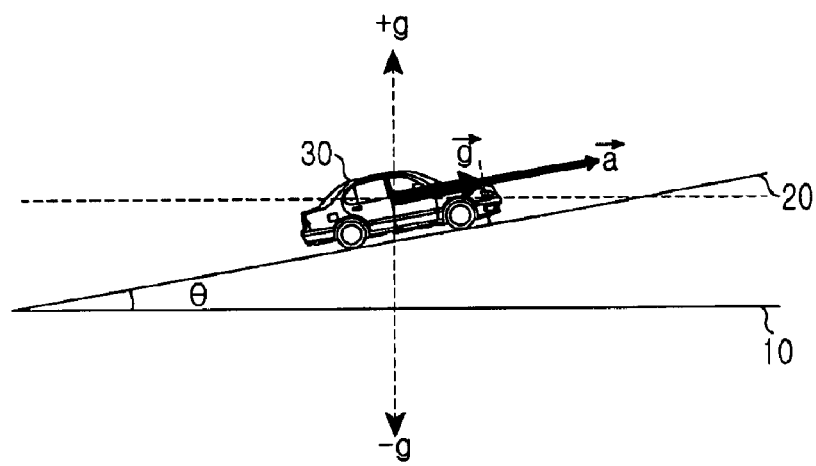
FIG. 1 illustrates gravity compensation for the output from an accelerometer.
Figure 2:
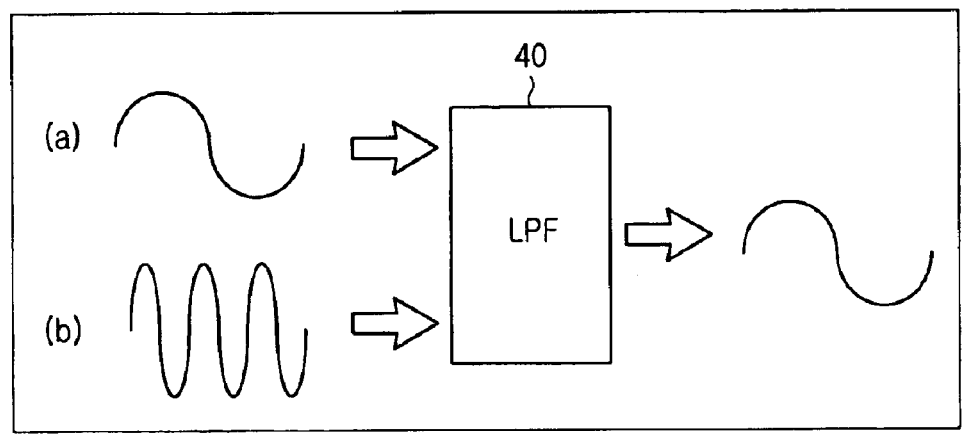
FIG. 2 is a diagram illustrating the procedure for measuring a gravitational component from the output from an accelerometer according to an embodiment of the prior art.
Figure 3:
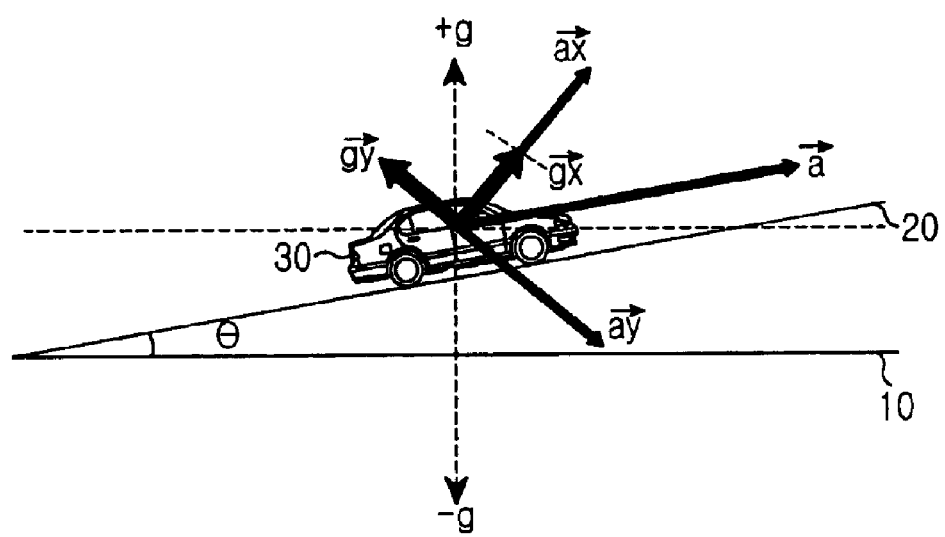
FIG. 3 illustrates gravity compensation for the output from an accelerometer using the two-axis information from the accelerometer.

FIG. 3 is illustrating the concept of gravity compensation for the output from an accelerometer using the two-axis information from the accelerometer. Referring to the drawing, the vehicle is equipped with two accelerometers (or, a two-axis accelerometer), which are mounted orthogonal to each other on the x-axis and y-axis. As the vehicle travels, the effect of gravitational acceleration on the acceleration measured by the accelerometer can be determined. Specifically, as the vehicle travels on a road 20 having an inclination angle θ relative to a plane 10 perpendicular to the earth's gravitational acceleration ±g, the acceleration $\vec{a}$ measured by the accelerometer can be obtained as the sum of an x-axis acceleration $\vec{a_x}$ and a y-axis acceleration $\vec{a_y}$ and these accelerations include an x-axis component $\vec{g_x}$ and a y-axis component $\vec{g_y}$ of the earth's gravitational acceleration, respectively.

Figure 4:
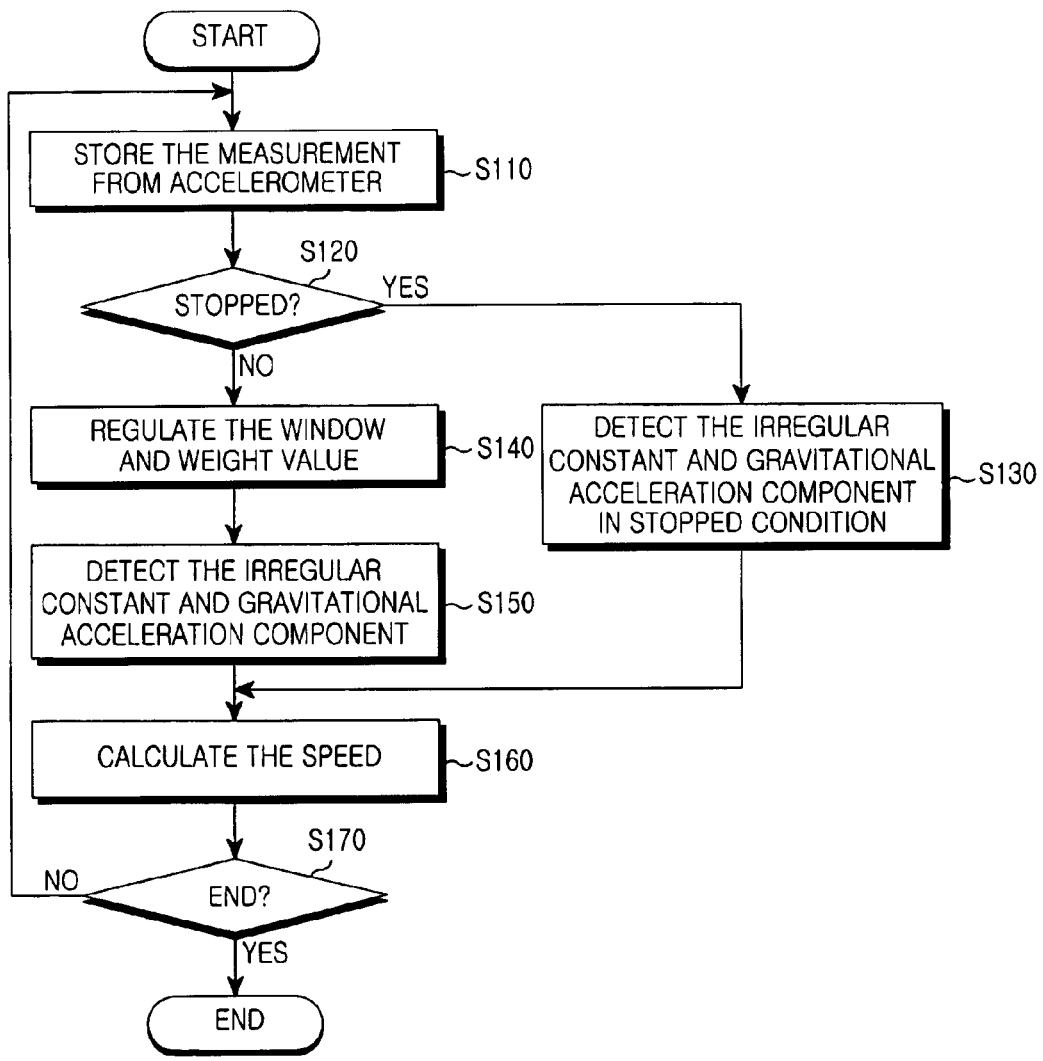
FIG. 4 is a flowchart showing a method for measuring the speed of a moving body according to an embodiment of the present invention.

FIG. 4 is a flowchart showing a method for measuring the speed of a moving body according to an embodiment of the present invention as mentioned above. Namely, FIG. 4 shows a speed measuring method using an apparatus for measuring the speed of a moving body according to an embodiment of the present invention. A method for measuring the speed of a moving body using a two-axis accelerometer will now be described with reference to FIGS. 3 and 4.

First, the apparatus for measuring the speed of a moving body according to the present invention stores the measurements from the accelerometer to measure the speed of the moving body in step S110. An example of common methods for storing the measurements from an accelerometer is discussed with reference to FIG. 5. Referring to FIG. 5, the measurements from the accelerometer are stored together with the information on time when the measurements have not been performed. The present example uses a two-axis accelerometer. As such, measurements illustrated in a table of FIG. 5 are stored corresponding to the x-axis and y-axis at each time. In this example, reference numeral "50" represents the window at the time of "t-1" and the size of the window is "3". The size of the window is increased/decreased according to the value of a reference parameter. The increase/decrease of the window corresponds to the increase/decrease of the range of time in which x-axis and y-axis measurements are chosen to calculate an average movement value. For example, the decrease of the window means that the latest measurements from the x-axis and y-axis are used to calculate the movement average.

Meanwhile, the movement characteristics of a moving body can be summarized as follows: the movement conditions of a moving body can be classified into an accelerated/decelerated traveling condition, a constant-speed traveling condition, and a stopped condition. A body always begins to move from a stopped condition. Then, the moving body experiences accelerated, constant-speed and decelerated traveling conditions and finally return to the stopped condition.

After storing the measurements from the accelerometer in step S110, the apparatus determines whether the moving body has stopped or not performed in step S120. Since a moving body always begin to move from a stopped condition, as mentioned above, the initial determination of the step S120 will be "STOP".

If the moving body is determined to be stopped, the apparatus measures an irregular constant and a gravitational acceleration component during a stopped condition in'step S130.

As used herein, an "irregular constant" means a constant, which is changed every time a power is applied to a system.

Every sensor has different value of the irregular constant. Once its value is set, it retains the value until a power is applied next time. In the present invention, the term "irregular constant" is used to mean a constant which is changed every time the power is applied to the accelerometer. Accordingly, in the case of a two-axis accelerometer, the x-axis and y-axis measurements $f_x$, $f_y$ obtained by the accelerometer comprise actual movement accelerations $a_x$, $a_y$, gravitational accelerations $g_x$, $g_y$, and irregular constants $b_x$, $b_y$, as is clear from Equation 2 given below:

$$f_x = a_x + g_x + b_x \qquad (2)$$

$$f_y = a_y + g_y + b_y$$

Suppose that the inclination angle of the road is $\theta$ and the mounting angle of the accelerometer is $\phi$, the x-axis gravitational acceleration $g_x$ is given as $g \cdot \sin(\phi+\theta)$ and the y-axis gravitational acceleration $g_y$ is given as $-g \cdot \cos(\phi+\theta)$.

In order to obtain the gravitational acceleration components included in the measurements $f_x(k)$, $f_y(k)$ at a given point of time $t_k$, the movement averages $m_x(k)$, $m_y(k)$ at the pertinent point of time should be obtained. The movement averages $m_x(k)$, $m_y(k)$ can be obtained using Equation 3 given below:

$$m_x(k) = \frac{\sum_{i=k-j+1}^{k} \alpha(i) f_x(i)}{\sum_{i=k-j+1}^{k} \alpha(i)} \qquad (3)$$

$$m_y(k) = \frac{\sum_{i=k-j+1}^{k} \beta(i) f_y(i)}{\sum_{i=k-j+1}^{k} \beta(i)}$$

wherein j is the size of the window, $\alpha(i)$ is a weight value to the measurement from the x-axis accelerometer, and $\beta(i)$ is a weigh value to the measurement from the y-axis accelerometer.

As a result, the movement average comes to mean the irregular constant and the gravitational acceleration component. This is because the movement average value acts as a low-pass filter to measure the irregular constant, which is a fixed value, and the gravitational acceleration component, which exists in the low-frequency domain.

After the movement average values $m_x(k)$, $m_y(k)$ are obtained at a given point of time $t_k$, they are used to calculate, in step S160, the speed of the moving body. First, the movement average values $m_x(k)$, $m_y(k)$ are subtracted from the measurements $f_x(k)$, $f_y(k)$ from the accelerator at the point of time $t_k$, as indicated in Equation 4 given below, to obtain the actual accelerations which are then used to calculate the speed of the moving body. The method for calculating the speed V of the moving body using the acceleration of the moving body is known in the art and an example thereof is given in Equation 5 below:

$$\hat{a}_x(k) = f_x(k) - m_x(k) \qquad (4)$$

$$\hat{a}_y(k) = f_y(k) - m_y(k)$$

$$V(k) = V(k-1) + \frac{1}{\cos\phi} \cdot \hat{a}_x(k) \cdot \Delta t \qquad (5)$$

Since the above step S130 is designed to measure the irregular constant and the gravitational acceleration component during a stopped condition of the moving body, the actual acceleration component $a_x$, $a_y$ of the moving body is "0". Therefore, referring to Equation 2, the measurements from the accelerometer will be given as the sum of the irregular constant and the gravitational acceleration component.

Meanwhile, if the moving body is not determined to be stopped during the step S120, the apparatus regulates the window and the weight value based on a predetermined standard for regulating the window and the weight value in step S140.

In order to regulate the window and the weight value during the step S140, a step of obtaining a reference parameter accxy(k) must be performed beforehand. An example of a method for obtaining the reference parameter accxy(k) is illustrated in Equation 6 given below:

$$accxy(k) = |\hat{a}_x(k) - \hat{a}_y(k)| \qquad (6)$$

Referring to Equation 6, the reference parameter accxy(k) is the magnitude of the difference between the value $\hat{a}_x(k)$ obtained by subtracting an x-axis movement average from a x-axis measurement and the value $\hat{a}_y(k)$ obtained by subtracting a y-axis movement average from a y-axis measurement. Accordingly, the magnitude of the parameter accxy(k) is proportional to the difference between the estimation value of the x-axis acceleration and that of the y-axis acceleration obtained by using the movement average. For example, when the mounting angle $\phi$ is not very far from 45°, the actual travel acceleration sensed by an x-axis sensor and that by a y-axis sensor will be similar to each other. Therefore, if the estimated accelerations on both axes are relatively correct, the parameter axxcy(k) would be small. In addition, when sensors of the same specification are mounted on both axes and the same window and weigh value of the movement average are applied to both axes, it can be assumed that both axes hive the same accuracy in estimation by the movement average, even if the noise of the sensors is taken into account. Under this assumption, a large value of accxy(k) means that current settings of the window and the weight value of the movement average are not suitable for estimating the current gravity and irregular constant. In other words, if the accxy(k) has a large value, the window and weight value of the movement average are not suitable for estimating the $m_x(k)$ and $m_y(k)$. Using this property, the magnitude of the window is set in a functional relationship with the magnitude of the accxy(k) and the weight value at each time is regulated accordingly. Then, the rate of response of the movement average, which measures the gravity and the irregular constant, to the change of the inclination angle of the road can be increased. If the accxy (k) is small, current settings are retained.

As such, by regulating the magnitude of the window of the movement average equation and the weight value assigned to the data at each time according to the magnitude of accxy(k), in step S160, the sensitivity to the change of the inclination angle of the road is improved. This reduces the instant speed error and, consequently, the sudden increase of position error in a short time can be prevented.

After the window and the weight value are regulated to calculate the speed of the moving body at the present point of time, in step S140, the irregular constant and the gravitational acceleration component are measured from the measurements obtained by the accelerometer at the present point of time, based on the window and the weight value in step S150. That is, the window and the weight value form the basis of calculating the movement average of the present point of time. The equation for calculating the movement average has previously been given in Equation 3.

After measuring the irregular constant and the gravitational acceleration component, i.e., the movement average, from the measurements from the accelerometer, the movement average is subtracted from the measurements from the accelerometer to obtain the actual acceleration of the moving body. The actual acceleration is then used to calculate the speed of the moving body in step S160. The step for calculating the speed of the moving body has previously been given in Equation 5.

The above steps S110 to S160 are repeated. On receiving an "END" command from outside, the steps S110 to S160 are ended.

Figure 6:
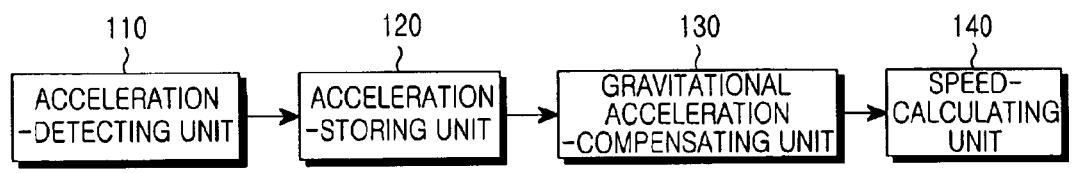
FIG. 6 is a block diagram illustrating an apparatus for measuring the speed of a moving body according to an embodiment of the present invention.

FIG. 6 is a block diagram illustrating an apparatus for measuring the speed of a moving body according to an embodiment of the present invention. Referring to FIG. 6, the apparatus 100 for measuring the speed of a moving body according to an embodiment of the present invention comprises an acceleration-measuring unit 110, an acceleration-storing unit 120, a gravitational acceleration-compensating unit 130, and a speed-calculating unit 140.

The acceleration-measuring unit 110 measures the current acceleration of the moving body from an accelerometer mounted on the moving body. The acceleration-measuring unit 110 measures the corresponding acceleration in accordance with the number of accelerometers. For example, if a two-axis accelerometer is mounted on the moving body, acceleration is measured both along the x-axis and y-axis.

The acceleration-storing unit 120 stores the information on the acceleration measured by the acceleration-measuring unit 110. An example of the acceleration information in the acceleration-storing unit 120 is given in FIG. 5. When a two-axis accelerometer is mounted on the moving body, acceleration is measured along the x-axis and y-axis every predetermined period for measuring the acceleration and then stored according to the time of measurement.

The gravitational acceleration-compensating unit 130 compensates the earth's gravitational acceleration included in the acceleration measured by the acceleration-measuring unit 110. In other words, the earth's gravitational acceleration included in the acceleration measured by the accelerometer is measured and removed from the acceleration. To this end, the gravitational acceleration-compensating unit 130 calculates the movement average of the acceleration at the point of time when the actual acceleration is to be obtained using the acceleration measurements stored in the acceleration-storing unit 120 in a time order. The movement average as used herein means the average value obtained from the measurements from the accelerometer included within a range of time (window) from the point of time when the actual acceleration is to be obtained. The movement average is subtracted from the accelerometer measurement at the point in time when the actual acceleration is to be obtained.

Particularly, the gravitational acceleration-compensating unit 130 assigns a weight value to each of the measurements from the accelerometer included in the window and calculates the movement average using the weight value. The unit 130 also regulates the window and the weight value based on the information on the traveling environment of the moving body. That is, the unit 130 calculates a parameter value for regulating the window and the weigh value and regulates the window and the weigh value based on the information on the magnitude of the parameter. This improves the sensitivity to the change of the inclination angle of the road and reduces the instant speed error.

The method for regulating the window and the weigh value based on the parameter value has been presented above in the summary of the invention. The initial values of the window and the weigh value are preferably those set previously for each point of time. The initial values for the window and the weigh value may be generated through experiment data by a user or created automatically by means of fuzzy learning.

The speed-calculating unit 140 calculates the speed of the moving body after receiving the actual acceleration value of the moving body from the gravitational acceleration-compensating unit 130. The method for calculating the speed of the moving body using its acceleration is known in the art and an example thereof has been presented in relation to Equation 5.

Figure 7:
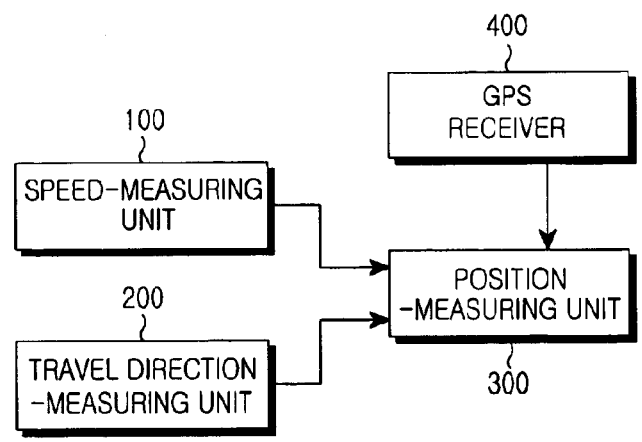
FIG. 7 is a block diagram showing a unit for measuring the present position of a vehicle navigation system to which an apparatus for measuring speed according to an embodiment of the present invention has been applied.

FIG. 7 is a block diagram showing a unit for measuring the current position of a vehicle navigation system to which a speed measuring apparatus according to an embodiment of the present invention has been applied. Referring to FIG. 7, the system comprises a speed-measuring unit 100 of the present invention as illustrated in FIG. 6, a travel direction-measuring unit 200, a position-measuring unit 300 and a GPS receiver 400. In the system, the position-measuring unit 300 receives information on the traveling speed of the moving body from the speed measuring unit 100, information on the traveling direction from the travel direction-measuring unit 200, and information on the current coordinate of the moving body from the GPS receiver 400 to accurately calculate the information on the current position of the moving body.

As mentioned above, according to the present invention, the gravitational acceleration component can be measured from the measurement data obtained by accelerometers mounted on two independent axes orthogonal to each other. Therefore, the inclination angle of a road can be estimated using accelerometers only. This saves costs by reducing the number of expensive gyroscopes in implementing a speed measuring apparatus for vehicles. In addition, the speed measuring apparatus designed according to the present invention has performance superior to that designed according to the prior art. This will contribute to the improvement in accuracy of position estimation of a position estimation apparatus for vehicles.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for measuring a speed of a moving body using an accelerometer, comprising the steps of:

setting a standard for regulating one or more windows, each of which window is a range of time for obtaining a movement average for a movement measurement value at a point of time from a plurality of movement measurement values measured by the accelerometer and a plurality of weight values for each of the measurement values included in the windows;

storing the measurements measured by the accelerometer;

determining whether the moving body has stopped at a point of time when the speed of the moving body is to be measured;

detecting an irregular constant of the accelerometer and a gravitational acceleration component at a stopped condition when the moving body has been determined to be in a stopped condition;

regulating the windows and the weight values based on a predetermined standard for regulating the windows and the weight values when the moving body has not been determined to be in a stopped condition;

detecting the irregular constant of the accelerometer for measuring the gravitational acceleration component and the gravitational acceleration component at the point of time, based on information in the windows and the weight values regulated during the regulating step; and calculating an actual acceleration value at a pertinent point of time by subtracting the irregular constant and the gravitational acceleration component from the acceleration measurement at the point of time and calculating the speed of the moving body based on the actual acceleration value.

2. The method according to claim 1, wherein the setting step comprises the step of storing measurements from a two-axis accelerometer.

3. The method according to claim 1, wherein the detecting based on the windows step further comprises the step of calculating a movement average at the pertinent point of time based on the information in the windows and the weight values set during the regulating step and detecting the irregular constant and the gravitational acceleration component using the movement average as a low-pass filter.

4. The method according to claim 1, wherein the regulating step further comprises the step of after setting a reference parameter, regulating the windows and the weight values using both the reference parameter and the standard for regulating the windows and the weight values.

5. The method according to claim 4, wherein the regulating step further comprises the step of setting the reference parameter as a magnitude of a difference between a value obtained by removing an x-axis movement average from an x-axis measurement from the two-axis accelerometer and another value obtained by removing a y-axis movement average from a y-axis measurement from the two-axis accelerometer.

6. The method according to claim 4, wherein the regulating step further comprises the step of setting an inversely proportional relationship between a magnitude of the reference parameter and a magnitude of the window.

7. The method according to claim 4, wherein the regulating step further comprises the step of assigning the larger weight value to the measurement, out of the measurements included in the window, nearer to the point of time within a determined range when the magnitude of the reference parameter is equal to or larger than a predetermined value.

8. An apparatus for measuring the speed of a moving body using an accelerometer, the apparatus comprising:

an acceleration-measuring unit for measuring the current acceleration of a moving body using an accelerometer mounted on the moving body;

an acceleration-storing unit for storing information on the acceleration measured by the acceleration-measuring unit according to the measurement time;

a gravitational acceleration-compensating unit for calculating a movement average of an acceleration at a point of time when an actual acceleration is to be obtained using the acceleration measurements stored in the acceleration-storing unit, wherein a weight value is assigned to each of the measurements from the accelerometer included in a window, which is a range of time from the point of time when the actual acceleration is to be obtained; the weight value being used to calculate the movement average; and the earth's gravitational acceleration component is compensated for the acceleration measurement at the pertinent point of time based on the movement average; and a speed-calculating unit for calculating the speed of the moving body using the information on the actual acceleration after compensation of the earth's gravitational acceleration by the gravitational acceleration-compensating unit.

9. The apparatus according to claim 8, wherein the gravitational acceleration-compensating unit detects the irregular constant for detecting the gravitational acceleration component, as well as the gravitational acceleration component at the pertinent point of time, using the movement average value as a low-pass filter and subtracts the irregular constant and the gravitational acceleration component from the measurement measured at the point of time, in order to compensate for the earth's gravitational acceleration.

10. The apparatus according to claim 9, wherein if the moving body is in a stopped condition at a point of time when the speed of the moving body is to be measured, the gravitational acceleration-compensating unit detects the irregular constant and the gravitational acceleration component at the point of time.

11. The apparatus according to claim 8, wherein the gravitational acceleration-compensating unit sets a reference parameter and regulates the windows and the weight values based on the reference parameter.

12. The apparatus according to claim 11, wherein the gravitational acceleration-compensating unit sets as the reference parameter a magnitude of a difference between a value obtained by removing an x-axis movement average from an x-axis measurement from the two-axis accelerometer and another value obtained by removing a y-axis movement average from a y-axis measurement from the two-axis accelerometer.

13. The apparatus according to claim 11, wherein the gravitational acceleration-compensating unit sets an inversely proportional relationship between a magnitude of the reference parameter and a magnitude of the window.

14. The apparatus according to claim 11, wherein the gravitational acceleration-compensating unit assigns the larger weight value to the measurement, out of the measurements included in the window, nearer to the point of time within a determined range when the magnitude of the reference parameter is equal to or larger than a predetermined value.

* * * * *